(12) United States Patent
Butscher et al.

(10) Patent No.: US 10,455,970 B2
(45) Date of Patent: *Oct. 29, 2019

(54) PACK, SYSTEM AND METHOD FOR PREPARING BEVERAGES

(71) Applicant: NESTEC S.A., Vevey (CH)

(72) Inventors: Silvio Butscher, Chezard-St-Martin (CH); Thomas Kaeser, Brent (CH); Alfred Yoakim, St-legier-la-Chiesaz (CH); Cynthia Scherz, Allaman (CH); Jean-Luc Denisart, Cully (CH)

(73) Assignee: Societe des Produits Nestle S.A., Vevey (CH)

( * ) Notice: Subject to any disclaimer, the term of this patent is extended or adjusted under 35 U.S.C. 154(b) by 244 days.

This patent is subject to a terminal disclaimer.

(21) Appl. No.: 15/329,463

(22) PCT Filed: Jul. 23, 2015

(86) PCT No.: PCT/EP2015/066821
§ 371 (c)(1),
(2) Date: Jan. 26, 2017

(87) PCT Pub. No.: WO2016/016074
PCT Pub. Date: Feb. 4, 2016

(65) Prior Publication Data
US 2017/0319001 A1    Nov. 9, 2017

(30) Foreign Application Priority Data
Jul. 30, 2014 (EP) .................................. 14179092

(51) Int. Cl.
*A47J 31/40* (2006.01)
*B65D 75/58* (2006.01)
(Continued)

(52) U.S. Cl.
CPC ............ *A47J 31/407* (2013.01); *B65D 75/20* (2013.01); *B65D 75/5883* (2013.01);
(Continued)

(58) Field of Classification Search
CPC ... A47J 31/407; B65D 75/20; B65D 85/8043; B65D 75/5883
See application file for complete search history.

(56) References Cited

U.S. PATENT DOCUMENTS

2012/0210879 A1   8/2012  Mariller

FOREIGN PATENT DOCUMENTS

| WO | 9905044 | 2/1999 |
|---|---|---|
| WO | 2011054402 | 5/2011 |
| WO | 2012175985 | 12/2012 |

*Primary Examiner* — Viren A Thakur
*Assistant Examiner* — Chaim A Smith
(74) *Attorney, Agent, or Firm* — K&L Gates LLP

(57) ABSTRACT

The invention concerns pack (1) with an inner volume (2) in which a food or beverage ingredient (7) is stored and in which a beverage is produced when water is introduced inside,—said inner volume (2) being defined by two sheets of material (10) joined to one another at their edges and said inner volume (2) presenting a generally plane shape defining a plane (P) vertically oriented during beverage production,—said pack comprising at least one inlet (3) for introducing water in the inner volume and at least one outlet (4) for delivering the beverage from said inner volume, the water inlet (3) and the beverage outlet (4) being included in one single insert (5), said single insert (5) being positioned at the bottom of the pack and being partially positioned between two joined edges of the sheets of material (10), the water inlet (3) being oriented essentially perpendicularly to the plane (P) defined by the inner volume (2), and—wherein the single insert (5) comprises a centring hole (53) extending essentially perpendicularly to the generally plane (P) shape of the inner volume.

15 Claims, 13 Drawing Sheets

(51) Int. Cl.
  *B65D 85/804*  (2006.01)
  *B65D 75/20*  (2006.01)
  *A47J 31/36*  (2006.01)
  *B65D 85/00*  (2006.01)
(52) U.S. Cl.
  CPC ........... *B65D 85/8043* (2013.01); *A47J 31/36* (2013.01); *B65D 85/00* (2013.01)

PACK, SYSTEM AND METHOD FOR PREPARING BEVERAGES

CROSS REFERENCE TO RELATED APPLICATIONS

The present application is a National Stage of International Application No. PCT/EP2015/066821, filed on Jul. 23, 2015, which claims priority to European Patent Application No. 14179092.3, filed Jul. 30, 2014, the entire contents of which are being incorporated herein by reference.

FIELD OF THE INVENTION

The present invention relates to packs and machines for the preparation of foods or beverages from packs comprising a food or beverage ingredient.

BACKGROUND OF THE INVENTION

It is known to prepare beverages by introducing a capsule containing a beverage making ingredient, such as ground coffee or instant coffee, in a beverage dispensing machine and injecting water into the capsule. The beverage making ingredient is extracted or dissolved into water to form the beverage. The beverage flows out of the capsule through a suitable outlet.

Different capsules have been developed in the past that can differentiate at least by the nature of the capsule body used for storing the food or beverage ingredient. Whereas most of the capsules are made of a rigid body or semi-rigid body (e.g. made though injection moulding, thermoforming, deep drawing, . . . ) flexible types of packs or sachets can be made out of foil materials. Flexible packs have generally the advantage to semi-rigid and rigid capsules that less amount of material is used to pack the product which leads to overall less production cost and lower life cycle impact shown in several life-cycle assessments.

WO 99/05044, GB 2 374 856 and WO 2012/175985 describe such a flexible pack made of two sheets of flexible air-and liquid-impermeable material bonded on theirs edges to define an inner volume for storing the beverage ingredient. The pack comprises an inlet nozzle at its top for introducing water that is mixed with the beverage ingredient inside the inner volume. The beverage is evacuated through a beverage outlet at the bottom of the sachet. The outlet is created further to bursting of the pack under the pressure of water introduced in the sachet. Generally the outlet is created due to the separation of the bottom edges of the flexible sheets further to the effect of heat or pressure in the sachet. According to a particular embodiment a spout can be introduced at the bottom of the pack: in that embodiment, the bottom edges of the flexible sheets do not separate and the beverage is evacuated by the spout.

These flexible sachets present drawbacks. Generally the opening of the beverage outlet is obtained by increase of pressure inside the sachet. Yet this pressure increase is not recommended for the preparation of some beverages because it creates bubbles at the surface of the beverage; for example it is not desired for the preparation of tea. Besides there can be a risk that the packages may not rupture at the desired pressure and that it can finally opens up in an uncontrollable explosion. For this reason the apparatus comprises means for totally enclosing the pack in the machine during beverage preparation and avoid damages or injuries for the operator.

Another drawback of these sachets is that the inlet spout introduces water in the pack always according to the same vertical top-down orientation in the sachet. Then all the beverages are produced according to the same process inside the sachet. Yet depending on the nature of the beverage ingredient and the desired beverage the beverage ingredient should be processed differently depending e.g. if foam is desired or not. In WO2012175985 a solution has been proposed which consists in proposing a beverage machine with different brewing heads (clamp) either for high pressure or low pressure beverage preparation.

Another drawbacks of these sachets is that it does not enable the delivery of foamy beverages, in particular milky beverages, directly from the sachet. Foamy beverages must be frothed in the drinking cup with a water jet as described in GB2374586. This implementation requires a longer time to prepare a foamy beverage (first for preparing the beverage from the sachet, secondly for frothing the beverage with the water jet) and does not give the feeling of a high quality beverage to the consumer.

WO 2011/024103 describes a pack for preparing a beverage defining an inner volume for storing the beverage ingredient. The inner volume is closed at its top by a rigid piece that integrates the water inlet and the beverage outlet. During the preparation of the beverage the beverage outlet is positioned at the top of the pack. Water is introduced until it fills the pack and overflows through the beverage outlet positioned at the top of the pack too. Such a pack is conceived for preparing a beverage by extraction of roast and ground coffee but not by dissolution of instant coffee or other soluble materials. For this reason the pack comprises a filter at the outlet to prevent insoluble particles from being dispensed with the beverage. An inconvenient of such a pack is that at the end of the preparation of the beverage and the introduction of water, beverage remains in the pack which is an issue for properly removing the pack from the beverage production machine. Besides in this pack neither the water inlet nor the beverage outlet are close by a membrane; then this implementation is not recommended in terms of hygiene and shelf life.

It is now proposed a new pack for the preparation of a food or beverage that improves the hereabove problems in terms of manufacturing, beverage preparation simplicity and cleanliness leading to an optimal overall beverage quality.

SUMMARY OF THE INVENTION

According to a first aspect, the invention concerns a pack with an inner volume in which a food or beverage ingredient is stored and in which a beverage is produced when water is introduced inside,
    said inner volume being defined by sheets of material joined to one another at their edges and said inner volume presenting a generally plane shape defining a plane (P) essentially vertically oriented during beverage production,
    said pack comprising at least one inlet for introducing water in the inner volume and at least one outlet for delivering the beverage from said inner volume, the water inlet and the beverage outlet being included in one single insert, said single insert being positioned at the bottom of the pack and being partially positioned between two joined edges of the sheets of material, and the external end of the water inlet being oriented essentially perpendicularly to the plane (P) defined by the inner volume, and wherein the single insert comprises a centring hole extending essentially perpendicularly to the generally plane (P) shape of the inner volume.

Preferably the pack comprises two flexible water impermeable sheets joined to one another to define the inner volume. As a consequence the pack itself is substantially flexible and looks like a pouch or sachet. By flexible, it is meant that the sheets can be bent easily. The resulting pack can be bent also; it is soft and can be deformed contrary to rigid containers. The flexible sheet material can be plastic laminates, metallised foil or alufoil or fibre base material. According to the invention the two flexible water impermeable sheets can be formed of one single flexible water impermeable sheet folded in half and joined at its free edges.

The pack presents a generally plane shape that is essentially vertically oriented during beverage production.

According to a specific embodiment the pack can comprise more than two sheets, in particular to increase the size of the inner volume. At least another sheet can be joined to the two first sheets that define the inner volume and the generally plane shape according to plane (P). For example, said other sheet(s) can create a doypack shape for the inner volume of the pack. Generally said other sheet(s) is/are joined to the edges of the two first sheets of material which do not comprise the water inlet and the beverage outlet.

The pack comprises at least one inlet for introducing water in the inner volume and at least one outlet for delivering the beverage from said inner volume, said water inlet and said beverage outlet being positioned at the bottom of the pack and being at least partially positioned between two joined edges of the sheets of material, the external end of the water inlet being oriented essentially perpendicularly to the plane (P) defined by the inner volume.

In the present invention the external end of the water inlet represents the end of the water inlet channel that cooperates with a water supply at the outside of the pack whereas the internal end of the water inlet represents the end of the water inlet channel that delivers water inside the pack.

As the beverage outlet is generally a tube extending essentially vertically from the inner volume, according to this configuration the water inlet and the beverage outlet are essentially perpendicularly oriented one to the other. Consequently the inlet and the outlet emerge on different sides of the pack. This configuration limits the contamination risk of the means for introducing water in the water inlet by the beverage dispensed by the beverage outlet.

In the present invention the insert is preferably rigid. Preferably the inserts are made of a rigid plastic material. This plastic material can be selected in the list of: polypropylene, polyethylene, polyethylene terephthalate and polylactic acid. According to a less preferred embodiment the insert can be made out of a metal like aluminium or tin-plate. The insert(s) can be injection molded.

The single insert is preferably positioned at or next to the middle of the bottom of the pack. It can also be positioned in the corner of the pack when the latter presents a corner.

According to one first embodiment the insert is positioned in joined bottom edges of the sheets of material so that the external end of the water inlet is covered by one sheet of material defining the inner volume. Consequently the same piece of material can be used to simultaneously create the inner volume of the pack, close the water inlet and protect the external end of the water end. Due to the enclosure of the beverage inlet in the pack there is no need for a particular membrane for closing the water inlet. The invention provides a pack that is easy to manufacture and guarantees hygienic and shelf life protection of the food and beverage ingredient and the produced beverage.

Preferably the single insert presents ribs on its external surface for improving the adhesion with the flexible material sheet during sealing. In particular a raising edge can surround the water inlet so as to improve air and water tightness around it.

According to one second embodiment the insert can be positioned in joined bottom edges so that the water inlet is not covered by one sheet of material defining the inner volume. In that case the water inlet insert is only partially positioned between two joined edges of the sheets of material.

Generally, the insert is positioned in joined bottom edges of the sheets of material so that the external end of the beverage outlet is positioned under the joined bottom edges of the sheets of material. Preferably the beverage outlet is not covered by the sheet. Yet it can be visually hidden by a part of the sheet e.g. by a skirt of the sheet.

According to one preferred mode the pack can be made of only one flexible material sheet, said sheet being folded at the top of the pack and bonded on its edges to define the inner volume, the bottom joined edge including the insert. This embodiment constitutes a particularly easy way to manufacture the pack since it requires the cutting of only one piece of sheet—most preferably according to a rectangular shape—and its folding to create the inner volume for the food or beverage ingredient. The single insert can be introduced in the bottom edge during the sealing of the edges.

According to a less preferred mode the pack can be made of two flexible material sheets, said sheets being bonded on their edges to define the inner volume, the bottom joined edges including the insert. The single insert can be introduced in the bottom edges during the sealing of these edges, two other side edges of the pack can be bonded so that the inner volume is defined and beverage ingredient can be introduced in said inner volume. Finally the last edges can be bonded to close the inner volume.

The single insert can be positioned at any place at the bottom of the pack between the both lateral sides of the bottom; it can be positioned at a bottom lateral side in particular a corner if the pack is globally rectangular or at any place between the corners. In the pack the water inlet and the beverage outlet of the pack are both simultaneously included in the same single insert. This feature covers the fact that the water inlet and the beverage outlet are part of the same insert piece in the pack. Yet this insert can be produced by the association of several parts before the complete piece is used for manufacturing the pack. In particular different parts can be clipped together to form the final single insert before said single insert is used for manufacturing the pack.

Preferably the single insert of the pack presents a shape for cooperating with the pack receiving area of a beverage production machine. In particular it can present a shape configured for sliding in the slot of the receiving area of a beverage production machine like an iron shape.

According to the preferred embodiment of the invention, before beverage preparation step, the beverage outlet is closed at its end. Generally the beverage outlet is closed by manufacturing and is configured for being opened at beverage production step. By "closed by manufacturing" it is meant that the pack is manufactured with a closed beverage outlet. This closure guarantees hygienic and shelf life protection.

According to said embodiment the beverage outlet is closed by a plug configured for being removed from the beverage outlet to open it at beverage production and said plug comprising a bond attached to the pack, preferably to the single insert, for maintaining the plug attached to the pack after the opening of the beverage outlet, said plug being positioned under the joined bottom edges of the sheets of material, Since the beverage outlet is closed by a plug, said plug comprising means for maintaining it attached to the pack after the opening of the beverage outlet, the plug does not fall in the beverage during its production. The means for maintaining the plug attached to the pack is a bond, said bond is preferably attached to the single insert.

Preferably the plug is part the single insert comprising the beverage outlet and the water inlet. Preferably the beverage outlet is a pipe and the connection between said pipe and the plug presents a mechanical weakness. This mechanical weakness can be a narrowing so that it can be made easy to cut or tear off the plug with a beverage outlet opening device of a beverage preparation machine. This reduced transversal section of the connection between the plug and the beverage outlet pipe creates a weakness. As a consequence the fact of pulling on the plug, facilitates the tearing of the material, of which the single insert is made of, at the level of this connection. The plug can be pulled according to a downwardly oriented direction or a laterally oriented direction or a combination of these both directions.

Preferably the connection between the pipe and the plug presents a smaller section than the plug upper surface and preferably smaller than the pipe section. Since the plug upper surface is larger than the connection section, it provides a surface to have a hold to tear the plug or to anchor a pulling device, for example to anchor a tearing device like the teeth of a fork.

Preferably the bond is attached to the single insert for maintaining the plug attached to the pack after the opening of the beverage outlet is configured for being bent. Consequently after being bent the plug remains away from the beverage outlet. According to that preference the bond is usually made of plastic. The bond can be made so thin that it is flexible. Once detached from the plug it can be moved away from the beverage outlet easily by a bond retaining device of a beverage preparation machine. According to a particular embodiment the plastic bond can present a notch in order to facilitate bending. So the bending of the bond by the retaining device of the machine is facilitated and the bond remains bent even if it is not retained by the bond retaining device of the machine. Preferably the notch is positioned close to the point of attachment of the bond to the single insert.

Preferably the bond is part of the single insert. According to the preferred embodiment the single insert comprises the water inlet, the beverage outlet, the plug and the bond of the plug. The single insert is preferably injection molded. In particular when the insert is injection molded, the design of the injection molded insert comprises the plug and the bond. This injection moulding of the insert including the water inlet, the beverage outlet, the plug and the bond in one single piece enables again to reach several aims with the use of only one material: the plastic for producing the insert comprising the water inlet and the beverage outlet is used to close the external end of the beverage outlet.

Internally the beverage outlet is preferably configured so that it delivers the beverage as a free flow once it is opened. The beverage can flow from the outlet by simple gravity fall. According to the preferred embodiment the outlet is a tube extending essentially vertically at the bottom of the single insert. Internally the tube can have a transverse section with a surface area equivalent to the surface of a circular surface of diameter of at least 1 mm, preferably at most 4 mm, even more preferably comprised between 1.5 and 3 mm. The length of the tube is preferably of at least 5 mm. Such a length generally enables a finalisation of the froth of the beverage before it is delivered in the drinking cup. An advantage of the outlet of the pack of the present invention is that there is no need to implement a particular connection between the beverage outlet and the beverage machine when a beverage is produced e.g. for directing the flow of beverage delivered at the outlet. The beverage can flow from the pack beverage outlet directly in a drinking cup.

The pack can comprise an excrescence enabling the handling of the pack.

The external shape of the pack is generally essentially rectangular.

Preferably at its bottom, the pack can present notches on each side of the single insert in order to facilitate its introduction in a beverage preparation machine comprising a receiving area presenting a shape corresponding to bottom design of the pack created by the notches.

The pack can comprise recognition means readable by the beverage preparation means. Such recognition means can be mechanical codes, optical codes, RFID tags, bar codes, magnetic codes.

According to the present invention the food or beverage ingredient of the pack can be comprised within the list of: soups, fruit juices, vegetable juices, bouillons, coffee, chocolate, tea, milk or creamer, or a combination thereof.

The food or beverage ingredient can be a soluble food or beverage ingredient. Preferably the food or beverage ingredient is a soluble food or beverage ingredient selected in the list of:

instant coffee powder, milk powder, cream powder, instant tea powder, cocoa powder, soup powder, fruit powder or mixture of said powders, a coffee concentrate, a milk concentrate, a syrup, a fruit concentrate, a tea extract.

The powders can be agglomerated or sintered. The powders or liquid concentrates can be mixed with solid pieces for example for preparing soups with solid pieces.

The food or beverage ingredient can also be an infusable food or beverage ingredient like a roast and ground coffee or tea leaves. In that embodiment water extracts the infusable ingredient.

The insert is configured and positioned in the pack so that the longitudinal axis of the water inlet channel at its external end is almost perpendicular to the generally plane shape (P) of the inner volume. Accordingly the water inlet is at least partially essentially horizontally oriented during beverage production.

Preferably the insert is configured so that the longitudinal axis of the water inlet channel at its internal end is almost comprised in the vertically oriented plane P.

Preferably the water inlet can be configured so that the direction of the water flow in the external end of the water inlet is almost perpendicular to the direction of the water flow in the internal end of the water inlet. In this embodiment the internal design of the water inlet enables a globally perpendicular change of orientation of the water flow from the external end of the water inlet (that faces the external part of the pack) to the internal end of the water inlet (that faces the internal part of the pack).

In the preferred embodiment the external end of the water inlet can comprise an inlet chamber, said chamber comprising an evacuation end and said evacuation end being an injection hole configured for directing water in the inner volume of the pack in a direction almost perpendicular to the inlet chamber longitudinal axis. Preferably the inlet chamber is globally horizontally oriented. This chamber is usually configured for receiving a hollow needle for injecting water. It can present a circular section. This chamber presents the advantage of creating a distance between the end of the hollow needle and the inner volume which stores the beverage ingredient and consequently avoids the contamination of the needle. Most preferably the chamber evacuation end is a hole pierced in the lateral wall of the chamber.

According to one particular embodiment the water inlet is configured for introducing water under the form of a jet in the inner volume of the pack. By jet it is understood a stream of liquid that comes out of the water inlet and in the inner volume of the pack quickly and with force. So the water inlet is configured for introducing water in the inner volume of the pack with a high velocity. Preferably the water inlet is configured for introducing a water jet in the inner volume of the pack, said water jet presenting a velocity of at least about 20 m/s, preferably at least 30 m/s. According to said first embodiment the water inlet is configured for transforming the pressurized water introduced by a beverage machine in the pack in a high velocity water jet in the inner volume of the pack. Such a configuration can be obtained by placing a constriction in the water path in the water inlet to reduce the size of the section of the water inlet. Due to the small surface of the inlet section pressurized creates a jet of water in the inner volume.

In general the water inlet comprises a hole presenting a transverse section with a surface area equivalent to the surface of a circular surface of diameter of at most 1 mm, preferably at least 0.24 mm.

The velocity for water emerging from the injection hole usually depends from the pressure of the water introduce at the water inlet. The invention generally applies for water pressurised between 2 and 10 bar, preferably of about 7 bar. For such values of pressurized water the water inlet generally comprises an injection hole presenting a transverse section with a surface area equivalent to the surface of a circular surface of diameter comprised between 0.2 and 0.8 mm, preferably between 0.3 and 0.5 mm and even more preferably of about 0.4 mm. But when water is pressurized at more than 11 bar the water inlet preferably comprises an injection hole presenting a transverse section with a surface area equivalent to the surface of a circular surface of diameter comprised between 0.5 and 1.5 mm, preferably of about 1 mm.

The small surface of the injection hole presents the advantage of avoiding any back flow of liquid contained in the inner volume of the pack through the water inlet.

For the same diluent supply pressure the surface of the diluent injection hole can vary according to the nature of the food and beverage ingredient inside the pack. In particular when the ingredient is difficult to dissolve a smaller injection hole creates a jet with a higher velocity which improves agitation and dissolution in the pack.

Preferably the pack presents a plane shape oriented along a plane essentially vertically oriented during beverage production and the water inlet orientates the jet of water in a direction comprised in said plane. The water jet introduced from the bottom into the pack is developing into circular and/or spiral movements creating turbulences, frictions and high contact surfaces between the water molecules and the product particles. In average the water molecules have several turns within the sachet until they leave the sachet with the beverage. Packs with single insert placed in the corner of an essentially rectangular pack also improve reconstitution.

This particular embodiment with creation of a jet is particularly interesting for packs comprising soluble beverage ingredients.

According to another particular embodiment the creation of a water jet in the pack is not desirable, for example for packs comprising infusable ingredients. Consequently the size of the water injection hole can be configured to avoid a jet in the inner volume of the pack.

The pack can present various external shapes like rectangular, square or round shapes. The inner volume of the pack can present the same shape as the external shape of the pack. According to one particular mode the inner volume can present a shape configured for improving the movement of the water and the beverage in the pack during beverage preparation. In particular for packs with external rectangular or square shapes at least one of the inside corner, preferably the both, can present a slanted shape. This feature avoids that beverage or food ingredient remains blocked in the right-angled corner. This feature can be obtained by sidewise sealing the corner of the pack.

According to the invention the single insert comprises a centring hole extending essentially perpendicularly to the generally plane (P) shape of the inner volume. This hole can be a traversing hole through the insert or a deep recess through the insert. It is configured for cooperating with a centring and immobilization device of a beverage preparation machine when the pack is introduced in said machine.

According to one embodiment the hole is positioned under the joined bottom edges of the sheets of material so as to remain free for cooperating with the centring and immobilization device of the beverage preparation machine.

According to another embodiment the hole is at least partially covered by the bottom of the sheets of material. This embodiment gives a nicer external aspect to the pack.

According to a particular mode of said last embodiment the part of the bottom of the sheet of material covering the hole can be configured for being easily tearable, deformable or bendable when a pressure is exercised on it. For example when the centring device of the beverage preparation machine is applied on this part, this part can be deformed, bent or torn to let the centring device enter in the hole.

According to a second aspect the invention concerns a system of a pack such as described above and a machine for preparing a beverage from a pack, said machine comprising:
  a pack receiving area for positioning the pack in the machine so that the generally plane shape of the inner volume is vertically oriented and so that the single insert is positioned at the bottom of the pack
  a water needle for injecting water in the water inlet of the pack,
  an immobilization and centring device configured for cooperating with the centring hole of the single insert.

Preferably the features of pack and the machine are defined so that the pack fits in the machine.

In particular the distances between the centring hole, the water inlet, the plug and the bond of the plug are set so as to be in front of the immobilization and centring device, the water needle, the device for removing the plug and the device for pulling the plastic bond of the plug respectively.

The beverage preparation machine usually comprises a water fluid system in order to deliver water to the water needle. The fluid system generally comprises at least a water supply, a pump for pumping water from the water supply and optionally a fluid temperature adjustment device (heating or cooling).

The pack receiving area for positioning the pack in the machine is generally designed to induce the customer to correctly place the pack in the machine for the preparation of a beverage with the single insert at the bottom and so that the water inlet faces the water needle. In particular the design of the pack receiving area can match with the general external shape of the pack. The pack itself can present visual indicators to correctly orientate the pack in the machine, especially if it presents a general symmetric shape with the single insert placed in the middle of the bottom of the pack.

Preferably the single insert of the pack presents a shape for cooperating with the pack receiving area of the beverage production machine and preferably the single insert of the pack presenting a shape configured for sliding in a slot of the receiving area of a beverage production machine.

Preferably the immobilization and centring device is a rod configured for sliding in the centring hole of the single insert. This immobilization and centring device can be pointed at its end in order to facilitate its sliding movement in the hole. This immobilization and centring device is preferably pointed when in the pack the centring hole is covered at least partially by the sheet. Consequently the immobilization and centring device can pierce the sheet above the hole.

Due to the fact that the pack is maintained in the machine essentially only through the single insert positioned at the bottom of the pack, a good fixing of the pack in the machine is more difficult than in the case of packs attached in the machine through an insert at their top. When the pack is filled with water, water weighs on the connection between the single insert and the machine. Here the immobilization and centring device guarantees that the pack is not twisted which would affect the beverage preparation and the beverage dispensing. Having the pack plane shape along a vertical orientation is particularly important for the beverage preparation, and even more when the water inlet is configured for orienting a jet of water in a direction comprised in said plane.

According to the preferred embodiment the machine prepares a beverage from a pack, said pack comprising a beverage outlet closed by a plug, said plug being attached to the pack, preferably to the single insert, by a bond for maintaining the plug attached to the pack after the opening of the beverage outlet, and the machine comprising:
  a device for removing the plug of the beverage outlet of the pack,
  a device for pulling the plastic bond of the plug away from the beverage outlet of the pack once the plug is removed from the beverage outlet.

Preferably the device for removing the plug of the beverage outlet of the pack is a two teeth fork configured so that each tooth is able to slide around the plug and the fork is able to tear the plug downwardly. The downwards movement of the fork can be obtained by an increasing thickness of the teeth along their length.

Preferably when the beverage outlet of the pack is a pipe and the connection between said pipe and the plug presents a smaller section than the plug upper surface, then the space between the teeth of the fork is smaller than the largest dimension of the plug upper surface.

Preferably the device for pulling the plastic bond of the plug away from the beverage outlet of the pack once the plug is removed from the beverage outlet is able to slide between the plug and the point where the bond of the plug is attached to the single insert and comprises a slanted surface sliding along the internal surface of the bond of the plug.

Preferably the water needle, the immobilization and centring device, the device for removing the plug and the device for pulling the plastic bond of the plug are movable back and forth according to a direction essentially perpendicular to the generally plane shape of the pack.

Preferably the water needle, the immobilization and centring device, the device for removing the plug and the device for pulling the plastic bond of the plug are being made movable simultaneously. Consequently the water inlet is opened at the same time as the beverage outlet and the beverage can prepared with the inlet and outlet being opened. So the beverage is not prepared in the pack under pressure or under pressure increase.

Generally the machine comprises an area for positioning a drinking cup under the beverage outlet of the pack when a beverage is prepared.

According to a first embodiment the receiving area for positioning the pack in the machine can present a shape conformal with the generally plane shape of the pack so that said generally plane shape faces the front and the back of the machine. So the plane shape (P) is parallel to the front and the back of the machine.

In this first embodiment the water needle, the immobilization and centring device, the device for removing the plug of the beverage outlet of the pack and the device for pulling the plastic bond of the plug away from the beverage outlet of the pack are movable back and forth according to a direction perpendicular to the generally plane shape of the pack and extending from the back of the machine to the front of the machine.

In this first embodiment the machine can comprise a second immobilization device providing a support for the centring of the pack and the openings of the inlet and the outlet. Said second immobilization device can be a flat slider able to slide along the single insert according to a horizontal direction. The dimensions of the single insert, preferably its width, can be defined so as to be closely immobilised between the flat slider and the other devices, in particular the water needle and the immobilization and centring device. The single insert can also present a general design so that the flat slider can easily slide along the insert, for example an iron shape. The second immobilization device can also be two flat sliders sliding in opposite horizontal directions.

According to a second embodiment the receiving area for positioning the pack in the machine can present a shape conformal with the generally plane shape of the pack so that said generally plane shape is essentially perpendicular to the front of the machine.

In this second embodiment the water needle, the immobilization and centring device, the device for removing the plug of the beverage outlet of the pack and the device for pulling the plastic bond of the plug away from the beverage outlet of the pack are movable back and forth according to a direction perpendicular to the generally plane shape of the pack and extending from at least one lateral side of the machine to the receiving area.

According to a third aspect the invention concerns a method for the preparation of a food or beverage with a system such as described above comprising the steps of:
  providing a pack and positioning said pack in the machine,
  centring the pack, opening the water inlet, optionally removing the plug and pulling it away,
  injecting water into the pack to mix with the food or beverage ingredient, allowing the prepared beverage to escape through the outlet into a receptacle.

Preferably the actions for centring the pack, opening the water inlet, removing the plug and pulling it away are implemented essentially simultaneously.

Preferably these actions are implemented before water is injected in the pack.

According to a particular mode, the actions for centring the pack, opening the water inlet are implemented essentially simultaneously and water is injected in the pack before removing the plug and pulling it away. Yet the plug is removed and pulled away before pressure rises in the pack.

In the present application the terms "bottom", "top", "lateral", "horizontal", "vertical", "downwardly" are used to describe the relational positioning of features of the invention. These terms should be understood to refer to the pack in its normal orientation when introduced in a beverage preparation machine for the production of a beverage as shown for example in FIG. 5, 11 or 12.

In the present application the terms "front", "back", "lateral" should be understood to refer to the beverage preparation machine in its normal orientation during use as shown for example in FIGS. 5 and 11.

According to the invention "next to the bottom" means that both the inlet and the outlet are positioned on the bottom edge of the pack and/or on the bottom part of one of the lateral sides of the package. The invention covers the different variants where both the inlet and the outlet are on the same edge of the pack that is both on the bottom edge or both at the bottom part of a lateral side and where either the outlet or the inlet is on the bottom edge and respectively the inlet or the outlet is at the bottom part of a lateral side of the pack. According to the invention the bottom part of a lateral side of the pack generally corresponds to the part of said lateral side positioned below the middle part of the pack and preferably closer to the bottom part of the pack rather than the middle part of the pack.

In the present invention the term "water" covers any aqueous diluent that can be mixed with a soluble beverage ingredient to prepare a beverage, like water, carbonated water, milk. It is preferably still water.

In the present application the terms "essentially vertical" cover orientations presenting an angle with vertical comprised between −5° and +5°.

BRIEF DESCRIPTION OF THE DRAWINGS

The characteristics and advantages of the invention will be better understood in relation to the following figures, in which.

DETAILED DESCRIPTION OF THE DRAWINGS

Figure 1A:
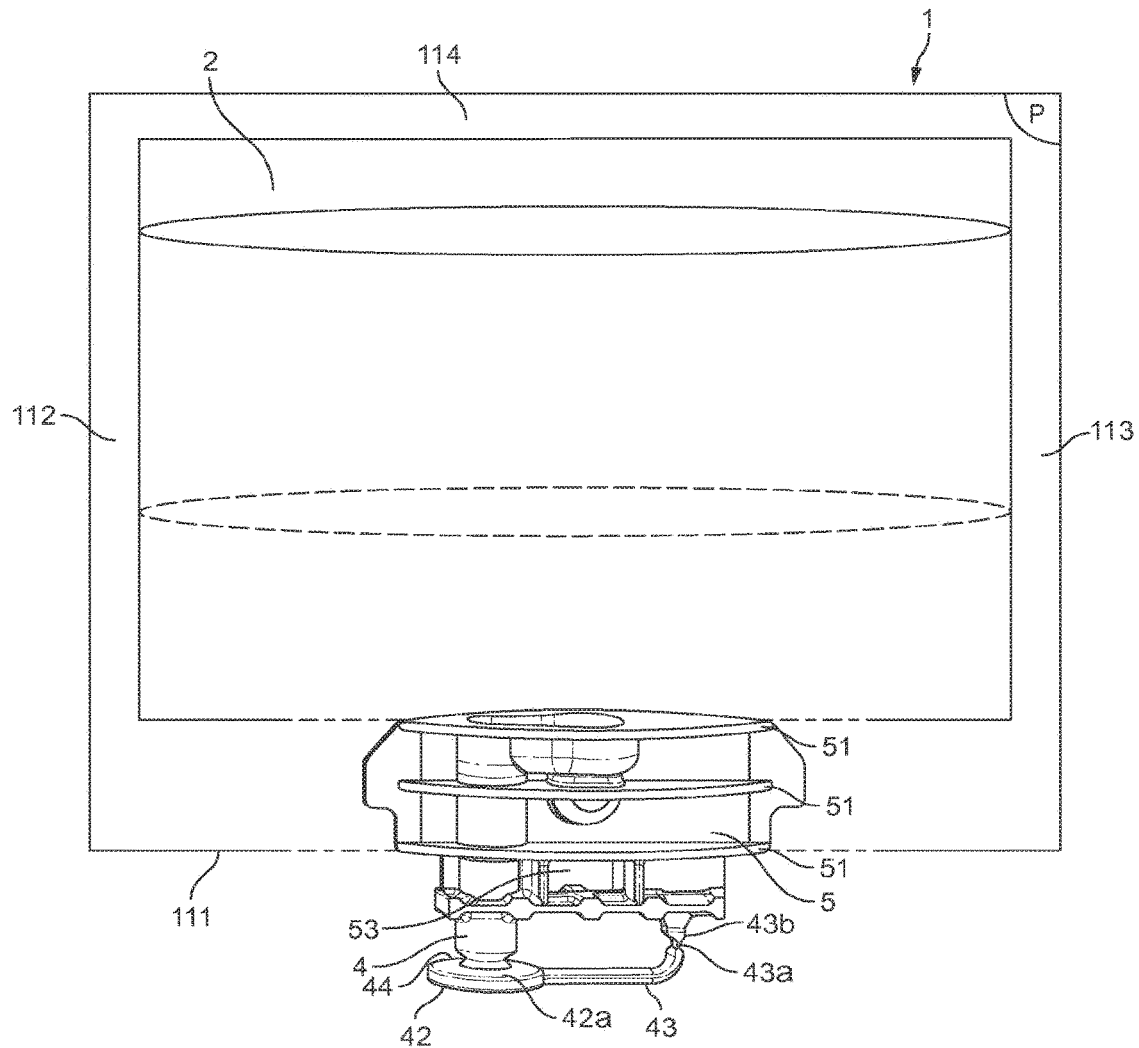
FIG. 1A illustrates a pack of the present invention.

FIG. 1A illustrates a pack 1 for producing a beverage according to the invention. The bottom of the pack has been made transparent to show the single insert 5. FIG. 2 shows the back side of said inert 5. The pack comprises two flexible water impermeable sheets joined one to another on their edges 111, 112, 113, 114 to define an inner volume 2. These two sheets can be obtained by folding one sheet in its middle to form the top 114 of the pack too; then only edges 112, 112, 113 have to be bonded together. The bonding can be obtained by heat sealing. A beverage material is disposed within said inner volume.

The bottom bonded edge 13 includes the single insert 5. The insert 5 is a single piece of material preferably of plastic. It includes simultaneously the water inlet for introducing water in the inner volume and a beverage outlet for dispensing the beverage or food issued from the mixing of the food or beverage ingredient with water.

Figure 2A:
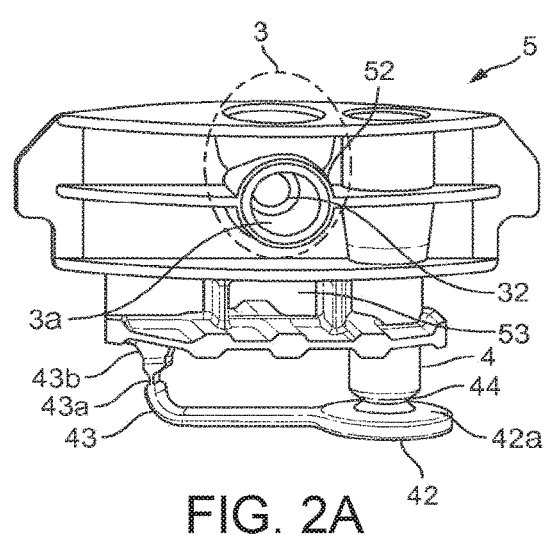
FIG. 2A illustrates the back side of the insert of the pack of FIGS. 1A and 1B.

The insert comprises one inlet 3 configured for supplying water in the inner volume 2 of the pack—as illustrated in FIG. 2A—and one outlet 4 for dispensing a beverage from the inner volume of the pack 2. The insert is positioned at the bottom of the pack at the bottom side 111 of the pack. The insert presents fins 51 and a raising edge 52 around the water inlet 3 on the lateral sides of the insert to improve the adhesion with the flexible material sheet during sealing. The water inlet 3 presents at its external end 3*a* an inlet chamber 32. This chamber is a hollow cavity; it is globally horizontally oriented. Its dimensions are configured for receiving the hollow needle of a beverage preparation machine in order to inject water. The inlet chamber presents an evacuation end (not illustrated) in its upper lateral wall: this evacuation end corresponds to an injection hole from which water can be injected in the inner volume 2, for example under the form of jet. Due to the configuration of the water inlet the water can be injected essentially horizontally at its external end 3*a* and essentially vertically in the inner volume 2 of the pack.

The beverage outlet is a vertical pipe in the insert. It preferably presents a diameter for dispensing the beverage under free flow. The beverage outlet is closed at its external end by a plug 42. This plug is made of one piece with the rest of the insert.

In the preferred illustrated embodiment the beverage outlet 4 is a pipe and the plug 42 is attached to the end of the pipe. The connection 44 between the pipe and the plug 42 presents a smaller section than the plug upper surface 42*a* and smaller than the pipe section. This connection creates a weakening narrow zone near the plug 42 so that said plug can be made easy to cut or to tear.

The pack comprises a plastic bond 43 for maintaining the plug 42 attached to the pack after removing of the plug from the beverage outlet. Consequently it avoids that the plug falls in the beverage during its production. This bond is made of one piece with the rest of the insert. The plastic bond 43 presents a notch 43a positioned close to the point 43b of attachment of the bond to the single insert. This notch enables an easy bending of the bond it guarantees that the plug 42 detached from the beverage outlet remains away from the beverage outlet and not under the beverage outlet.

Figure 1B:
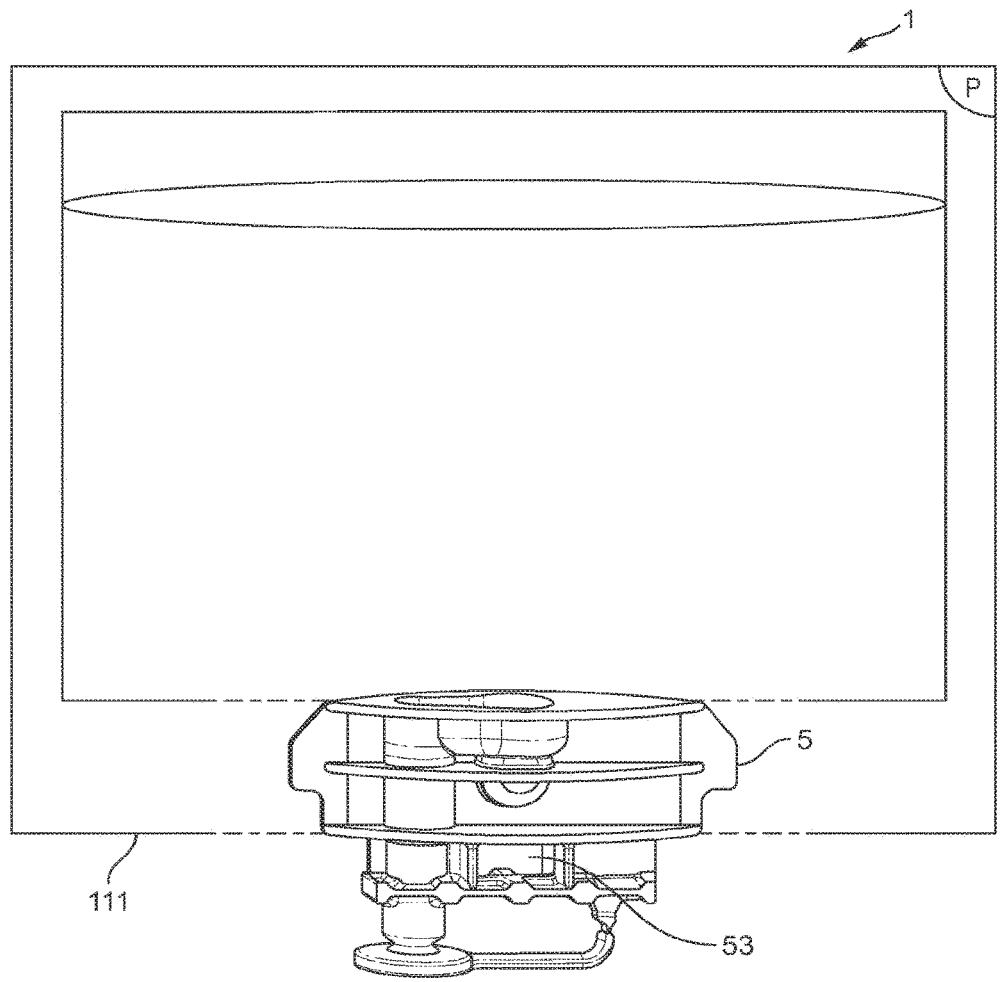
FIGS. 1B, 3A, 3B, 4A and 4B are variants of the pack.

The pack comprises a centring hole 53 extending essentially perpendicularly to the generally plane (P) shape of the inner volume and through the insert. It is positioned under the joined bottom edges 111 of the sheets of material so as to remain free for cooperating with the centring and immobilization device of the beverage preparation machine FIG. 1B illustrates a variant of the pack of FIGS. 1A and 1B wherein the centring hole 53 is covered and closed by the joined bottom edges 111 of the sheets of material. The bottom of the pack has been made transparent to show the position of the single insert 5 under the joined bottom edges 111.

Figure 2B:
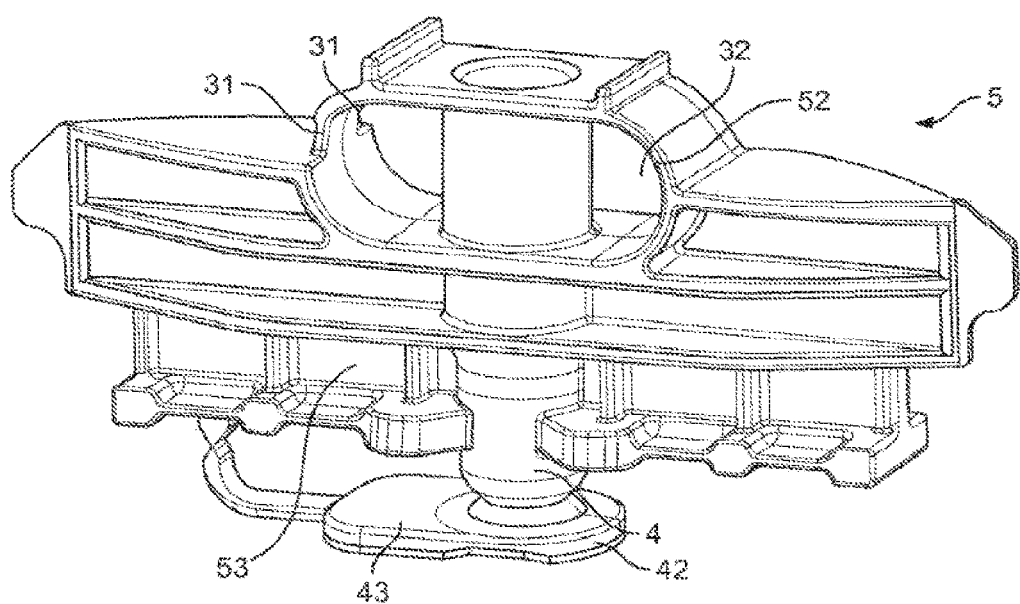
FIG. 2B illustrates a variant of the insert.

The invention is not limited to the particular design of the water inlet of FIGS. 1A, 2A and 2B. For example FIG. 2A illustrates a single insert 5 wherein the inlet chamber 32 comprises two evacuation ends 31 in its side wall. The evacuation ends 31 are positioned in the evacuation chamber walls such that water can be introduced in the inner volume of the pack essentially horizontally. Depending on the size of the evacuation ends 31, water may also gently flow inside the inner volume rather than in the form of a jet. In such an insert a part of the walls of the inlet chamber is defined by the sheet material covering the insert.

Figure 3A:
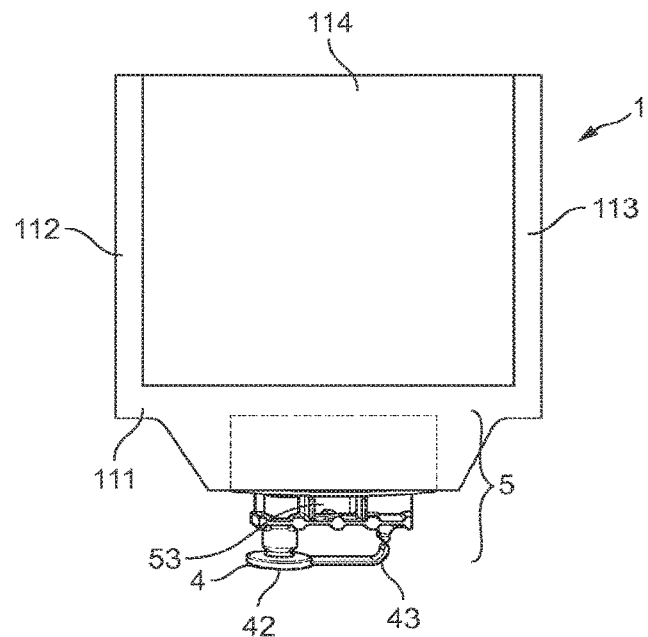
Figure 5:
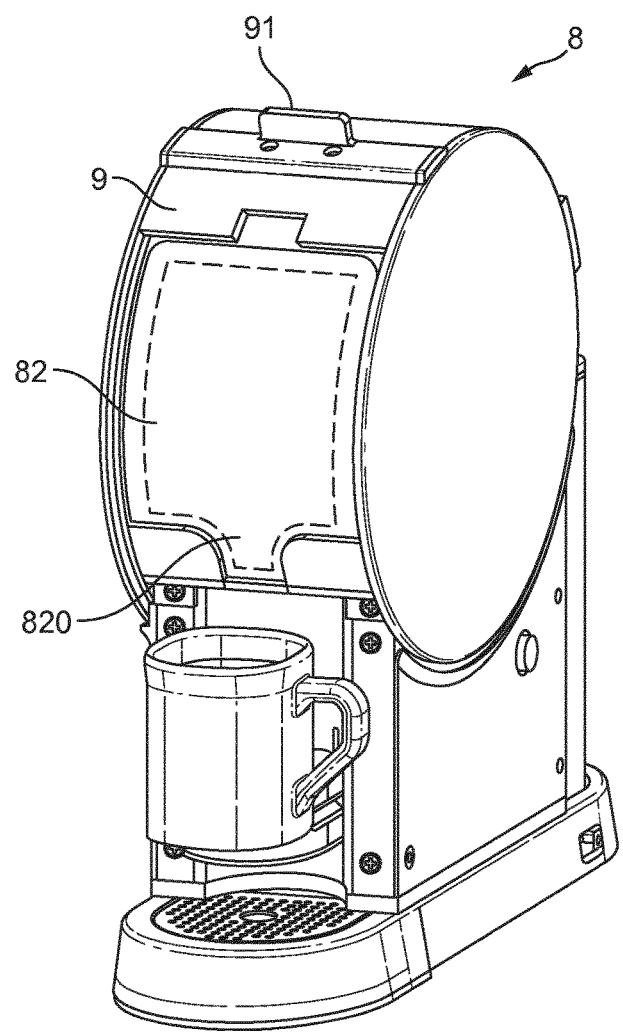
FIG. 5 illustrates a beverage preparation machine of the present invention according to the first embodiment.

FIG. 3A illustrates a variant of the invention wherein the general plane shape (P) defined by the sheets of material presents notches on each side of the single insert in order to facilitate the introduction of the pack 1 in a beverage preparation machine comprising a receiving area presenting a shape corresponding to bottom design of the pack created by the notches (FIG. 5).

Figure 3B:
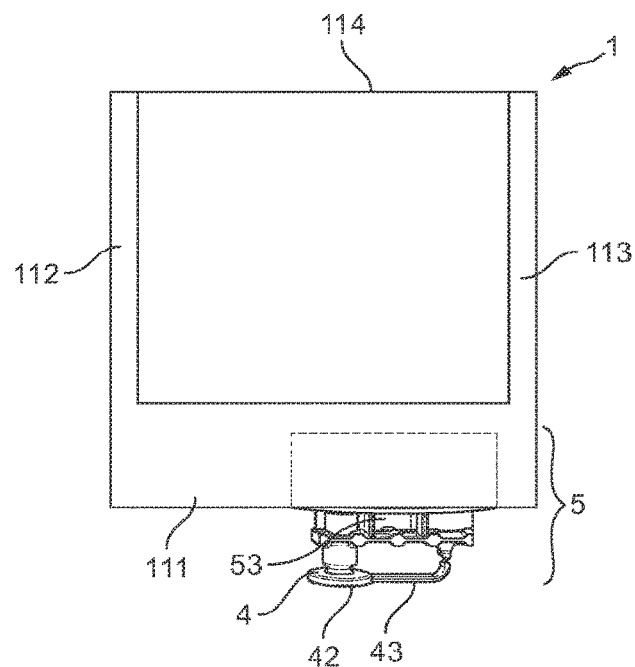
Figure 11:
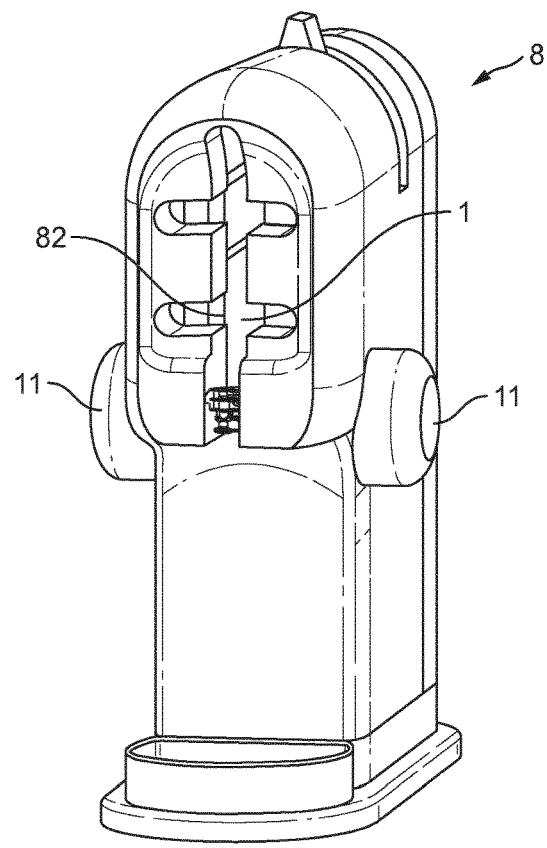
FIG. 11 illustrates a beverage preparation machine of the present invention according to the second embodiment.

FIG. 3B illustrates a variant of the invention wherein the insert 5 is positioned closer to a lateral side of the bottom of the pack rather than to the middle. Such a pack can be used in a beverage preparation machine comprising a receiving area presenting a shape corresponding to the position of the insert in the pack (FIG. 11).

Figure 4A:
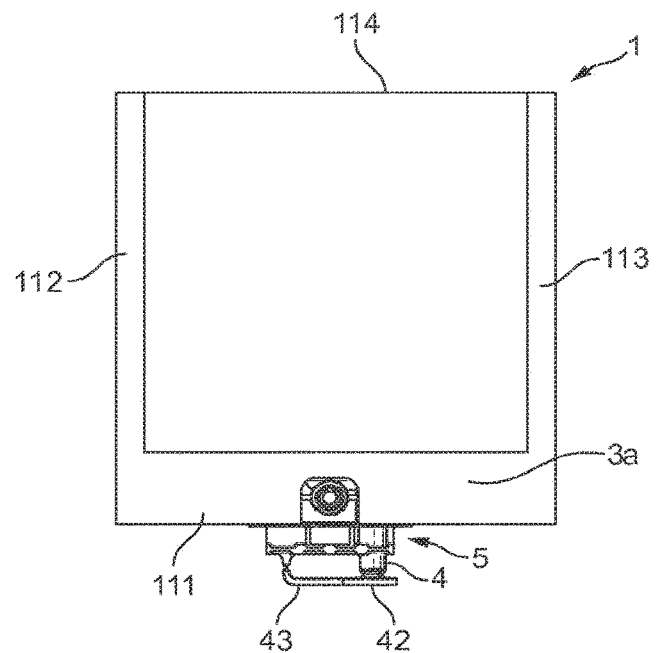
Figure 4B:
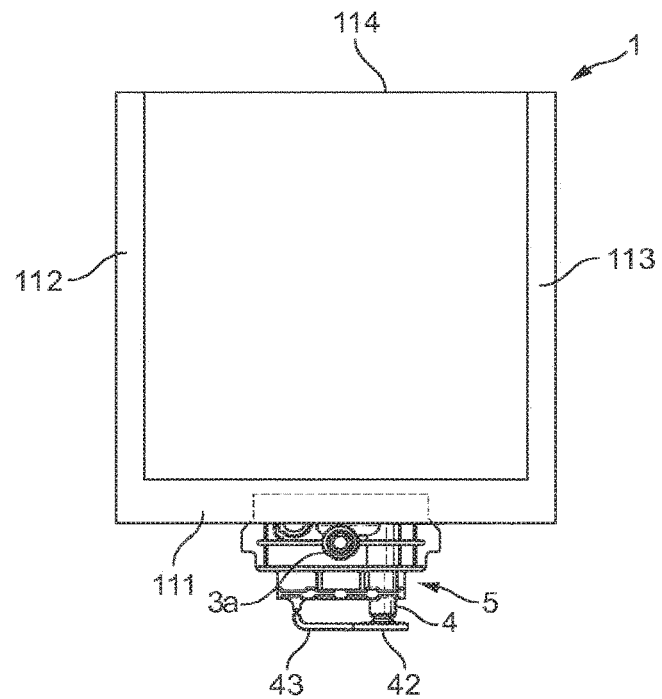

Whatever the type of insert in the packs, the packs can be configured so that the external end 3 a of the water inlet is not covered by the sheet of material that creates and designs the inner volume 2 of the pack. This embodiment can be due to the fact that the external end 3 a of the water inlet is closer to the bottom of the insert and/or because the sheet of material does not cover the full surface of the insert 5, for example the bottom edge 111 of the sheet does not cover the lower part of the insert or presents a notch that does not cover the water inlet external end 3 a as illustrated in FIGS. 4A and 4B.

FIG. 5 illustrates a machine according to a first embodiment of the invention wherein the receiving area 82 for positioning the pack presents a shape conformal with the generally plane shape (P) of the pack so that said generally plane shape (P) faces the front and the back of the machine. Dotted lines illustrate how the pack 1—for example the pack of FIG. 3A—can be positioned in the receiving area. The receiving area presents a shape reproducing the notches of the pack and inducing the customer to place the insert 5 of the pack at the middle 820 of the bottom of the receiving area, that is to say the pack 1 with the single insert 5 oriented downwards.

In such a machine the pack is positioned with the plane P of the pack facing the front of the machine and the customer.

The machine comprises a cover 9 to cover the pack during its preparation. The closure of the cover 9 also initiates the preparation of the beverage as disclosed hereinafter. The cover can present a handle 91 to help the customer to pull the cover.

The machine presents a drinking cup receiving area. It comprises a water fluid system for producing water under pressure either hot or cold.

Figure 6:
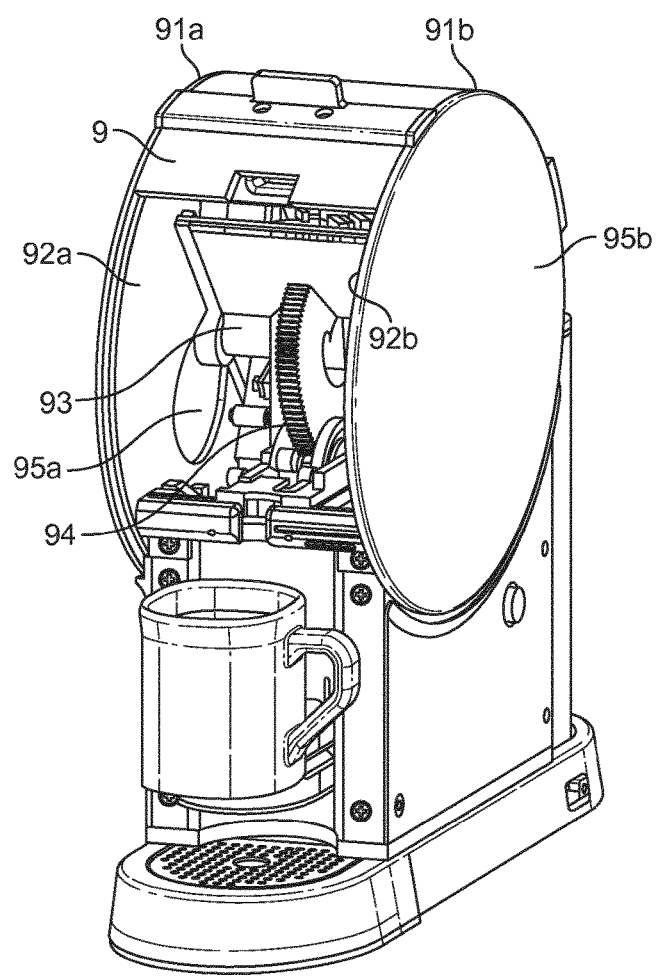
FIG. 6 is a view of the beverage preparation machine of FIG. 5 in which the internal back panel has been withdrawn to show the internal parts of the receiving area of the machine.

In FIG. 6 the back side of the receiving area 82 was removed to show the internal parts of the machine and in particular the mechanism which enable simultaneously the closure of the cover and the beverage preparation. The cover is rounded and attached on its lateral sides 91a, 91b to discs 95a, 95b. The centres of the discs are connected through a first shaft 93. Consequently the rotation of the discs 95a, 95b due to the sliding of the cover 9 induces the rotation of the first shaft 93. The cover 9 and the discs 95a, 95b are supported by lateral frames 92a, 92b.

A first geared wheel 94 is fixedly attached to the middle of the first shaft 93 so that the sliding of the cover rotates the first geared wheel 94.

Figure 7:
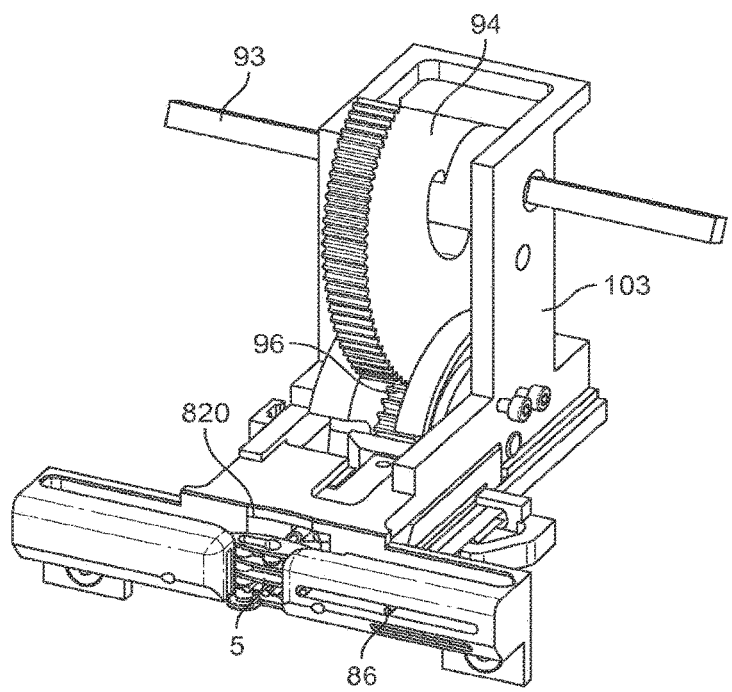
FIG. 7 is a magnified view of the receiving area of FIG. 5, FIGS. 8A, 8B are top views of FIG. 7.

FIG. 7 is magnified view of the mechanism activated by the rotation of the first gear wheel 94. The teeth of the first geared wheel 94 engage the teeth of a second gear wheel 96 that controls the movement of the devices for opening the inlet and the outlet of the pack. This figure shows the single insert 5 of a pack positioned at the middle 820 of the bottom of the receiving area of the machine. The sheets of the inner volume of the pack are not represented for a better understanding of the mechanism. This figure illustrates the presence of a slider 86 as a second immobilization device able to provide a support for the centring of the pack and the openings of the inlet and the outlet. This slider is able to slide laterally inside a part of the main support member 103 of the mechanism.

Figure 8A:
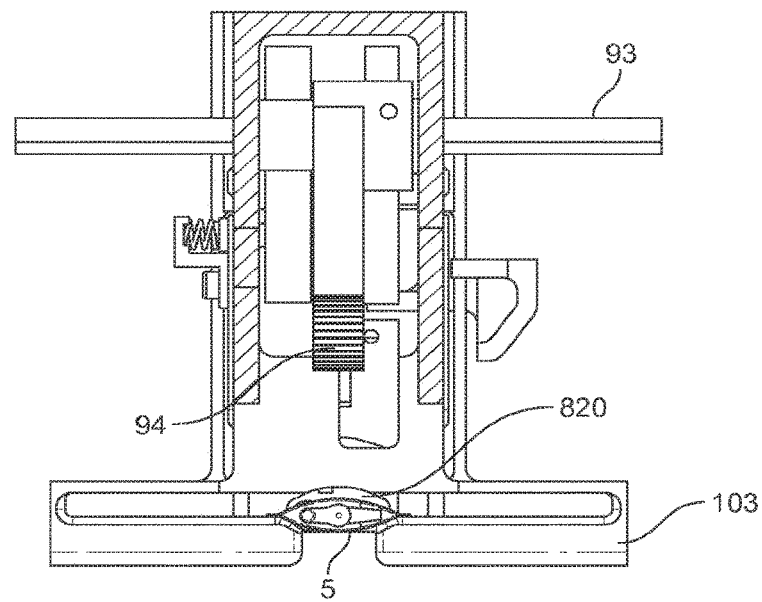

FIG. 8A is a top view of FIG. 7 showing the shape of the pack receiving area 820 at the level of the single insert.

Figure 8B:
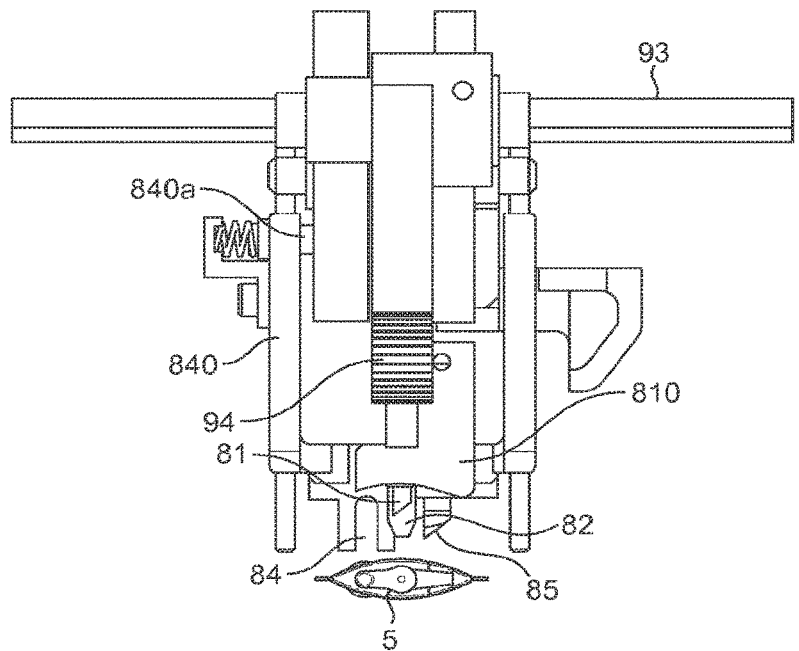
Figure 9:
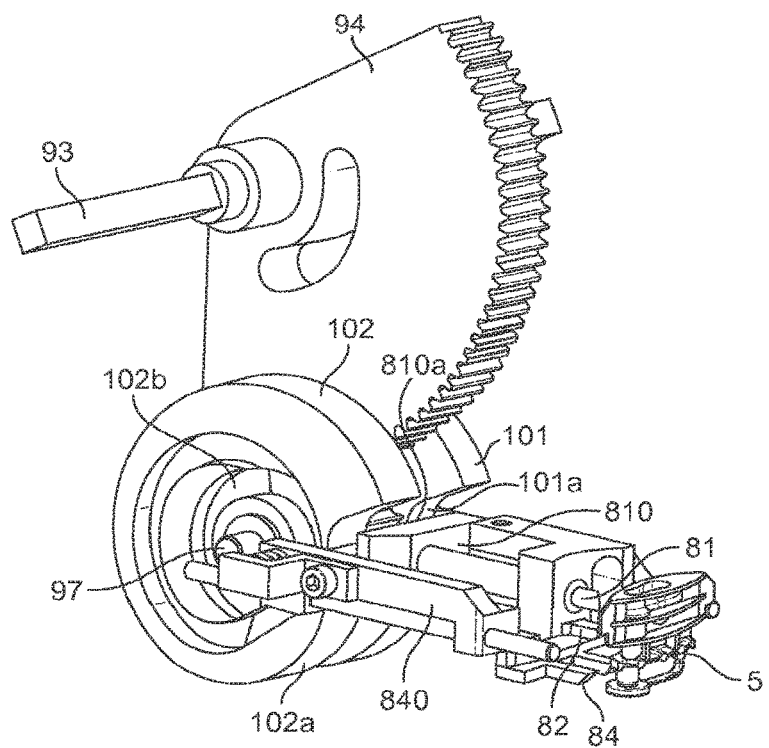
FIG. 9 is a view of the devices of the receiving area cooperating with the pack.
Figure 10A:
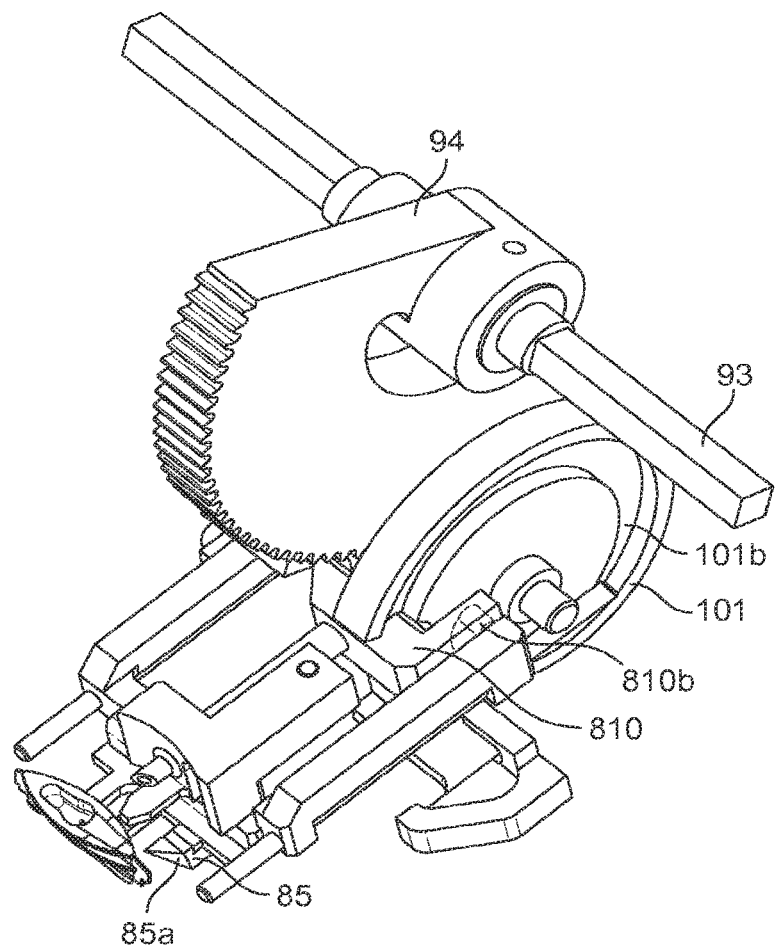
FIG. 10A is another side view of the particular elements of FIG. 7.
Figure 10B:
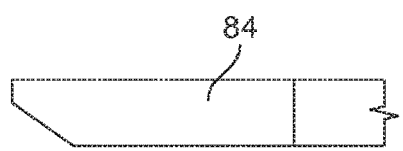
FIG. 10B is a side view of one tooth of the fork.

FIG. 8B corresponds to FIG. 8A in which the main support member 83 has been removed for a further understanding. It is commented in combination with FIGS. 9, 10A and 10B which are perspective views of the mechanism.

The centre of the second geared wheel 96 is attached to a second shaft 97 which extends on both lateral sides of the second geared wheel. On each lateral side of the second geared wheel 96 a rotating and guiding element 101, 102 is attached to the second shaft 97. So the rotation of the second geared wheel 96 rotates the second shaft 97 and the both rotating and guiding elements 101, 102.

The machine comprises a water injection needle 81. The needle is a hollow needle of which extremity is sufficiently sharp to pierce the flexible material of the sheet covering the water inlet in the single insert. The hole in the needle delivers water from the fluid system of the machine. The upstream part of the needle is connected to the fluid system through a pipe, which is not represented. The needle is supported and oriented in direction of the single insert 5 by a first support 810. This first support 810 also supports the alignment and centring device 82 which presents a point configured for entering inside the hole 53 of the single insert. Consequently the alignment and centring device 82 and the needle move together. Yet due to the fact that the alignment and centring device 82 is positioned closer to the front of the machine than the tip of the needle—as illustrated in FIG. 8B—the pack is aligned and centred before the needle pierces the pack. The first support 810 of the needle and the alignment and centring device 82 presents a back face 810 a in contact with the external faces 101 a and 102 a of the rotating and guiding elements. This interface between the back face 810 a of the needle support and the external faces 101 a and 102 a of the rotating and guiding elements enables the movement of the needle and the alignment and centring device 82 from the back to the front of the machine during the closure of the cover and so the centring of the pack and the opening of the water inlet in the pack.

The first support member 810 cooperates at its back end with the guiding curve 101b hollowed in the lateral face of the first rotating and guiding element 101. The cooperation is made through a pin 810b attached at one end to the first support member 810 and able to slide in the guiding curve at its other end. This interface between the needle support 810 and the first rotating and guiding element 101 enables the movement of the needle and the alignment and centring device 82 from the front to the back of the machine during the opening of the cover and so enabling the customer to remove the pack from the machine.

The machine comprises a device 84 for removing the plug of the beverage outlet of the pack. This device is a fork with two teeth. Preferably the teeth present the lateral profile illustrated in FIG. 10B that is with a front tip presenting a thinner height than the rest of the teeth. Due to this profile the fork can engage the beverage outlet pipe 4 up to the plug 42 firstly and then further to the movement of the fork in direction of the front of the machine the teeth presses on the plug upper surface 42 a more and more until they tear the plug off.

The machine comprises a device 85 for pulling the plastic bond of the plug away from the beverage outlet of the pack once the plug is removed from the beverage outlet. This device is a plate able to slide between the plug 44 and the point 43a where the bond of the plug is attached to the single insert and comprises a slanted surface 85a engaging/sliding along the surface of the bond of the plug when said device moves to the front of the machine.

The device 84 for removing the plug of the beverage outlet of the pack and the device 85 for pulling the plastic bond of the plug away from the beverage outlet of the pack are both supported by the same second support member 840. This second support member 840 cooperates at its back end with the guiding curve 102b hollowed in the lateral face of the second rotating and guiding element 102. The cooperation is made through a pin 840a attached at one end to the second support member 840 and slid in the guiding curve 102b at its other end. This interface between the second support 840 and the second rotating and guiding element 102 enables the movement of the device 84 for removing the plug of the beverage outlet of the pack and the device 85 for pulling the plastic bond of the plug away from the beverage outlet of the pack from the front to the back of the machine back and forth during opening and closure of the cover. The guiding curve 102b hollowed in the lateral face of the second rotating and guiding element 102 presents different depths so that the movement of the devices 84, 85 can be different between according to the rotation of the shaft in one sense or in the other sense. The pin 840a attached to the first support member 840 and slid in the guiding curve 102b is spring loaded in order to always be in contact with the guiding curve 102b whatever its depth.

Based on the above the process for preparing a beverage from a pack 1 and the machine 8 is the following. A pack is positioned in the receiving area 82 of the machine with the single insert in the middle 820 of the bottom of this area. Preferably the pack presents a visual indicator on one of the face of the planar shape to inform the customer which face must be placed in front of the machine.

The cover 9 is closed and its rotation rotates the shaft 93, the first geared wheel, the second geared wheel and the both rotating and guiding elements 101, 102. The rotation of these last elements induces the displacement of the first support member 810 to the front of the machine. As long as the rotation induced by the cover closure occurs the first support member 810 moves to the front of the machine. So the pack is centred, immobilised and the water inlet is pierced by and connect to the water needle. Simultaneously the rotation of the second rotating and guiding elements 102 induces the displacement of the second support member 840 to the front of the machine. Yet the guiding curve 102b is designed so that during the first part of the rotation induced by the cover closure the second support member 840 moves to the front of the machine and during the second part of the rotation induced by the cover closure the second support member 840 moves to the back of the machine. So the fork 84 and the plate for pulling the bond moves to the front and then to the back during the cover closure. Consequently the plug 42 is torn from the beverage outlet by the fork 84 that engages the plug upper surface and the bond 43 is bent by the inclined surface of the plate 85. These both devices move to the back of the machine so as not be near to the beverage outlet during the beverage dispensing and so as not be dirtied.

Then the beverage is prepared by introduction of water in the package through the needle and the beverage is dispensed through the beverage outlet in a drinking cup positioned under.

Further to the beverage preparation the cover 9 is opened. Its rotation rotates the shaft 93, the first geared wheel, the second geared wheel and the both rotating and guiding elements 101, 102. The rotation of the first rotating and guiding element 101 induces the displacement of the first support member 810 to the back of the machine due to the cooperation of the pin 810b in the guiding curve 101b. As long as the rotation induced by the cover opening occurs the first support member 810 moves to the back of the machine. So the pack is free and the water inlet is removed from the receiving area. Simultaneously the rotation of the second rotating and guiding elements 102 enables the displacement of the second support member 840 to its rest position at the back of the machine. The pack can be removed from the machine.

FIG. 11 illustrates a machine according to the second embodiment wherein the receiving area 82 for positioning the pack 1 in the machine presents a shape conformal with the generally plane shape of the pack so that said generally plane shape is perpendicular to the front of the machine. The receiving area 82 presents the shape of a vertical slit in which the customer is able to slide the pack 1 hold with the plane shape P vertically oriented.

Figure 12:
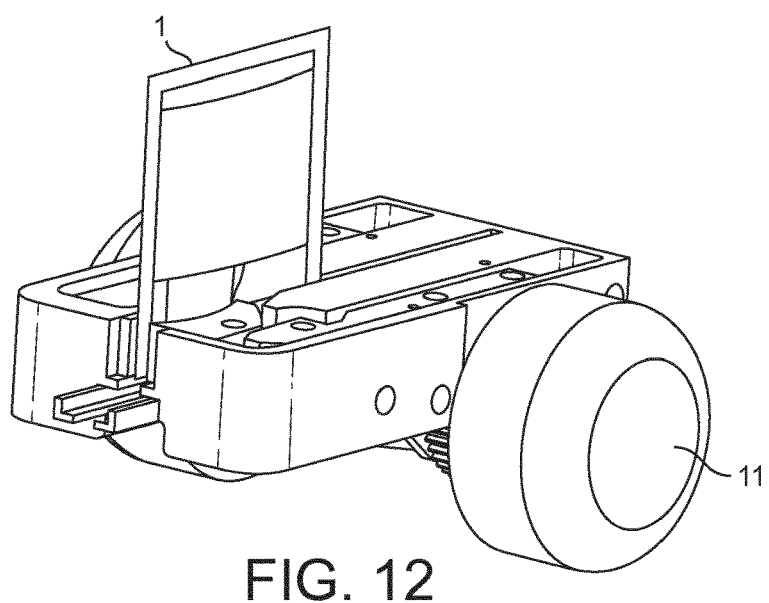
FIG. 12 is an extracted view of the of the receiving area of FIG. 11.

FIG. 12 is a partial view of the internal parts of the machine enabling the opening of the water inlet and the beverage outlet of the pack once the pack has been positioned in the receiving area of the machine. The opening mechanism is activated by the rotation of rollers 11 on each side of the machine.

Figure 13:
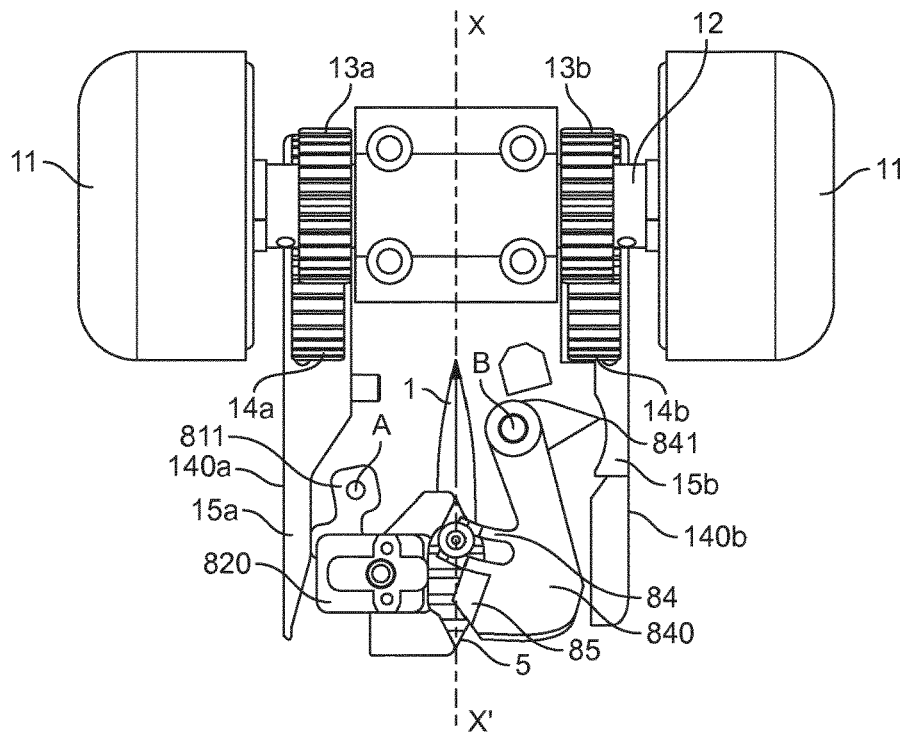
FIG. 13 is a bottom view of the mechanism of FIG. 12, FIG. 14 corresponds to FIG. 13 in which the single inert has been removed.
Figure 14:
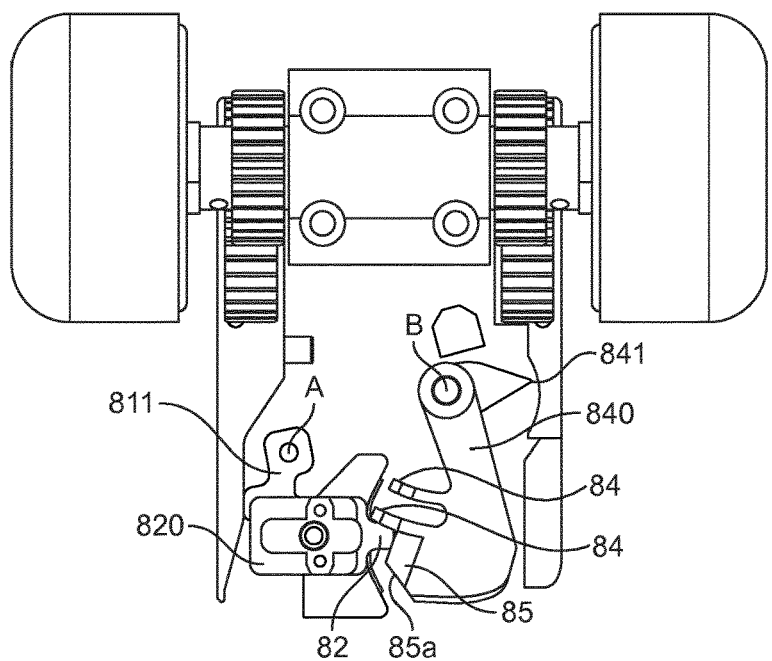
Figure 15:
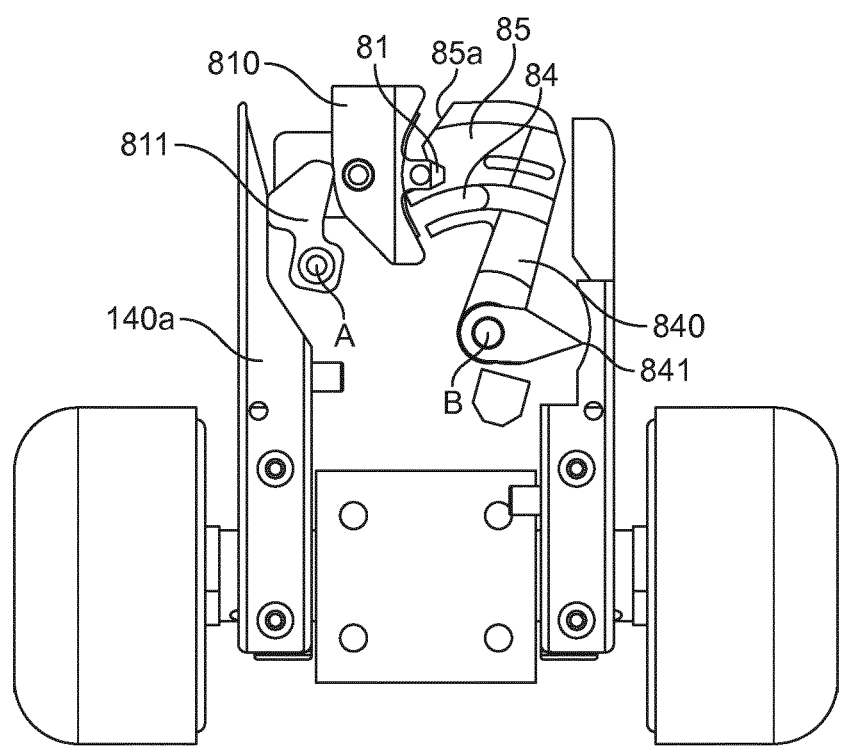
FIG. 15 is a top view of the mechanism of FIG. 14.

FIGS. 13, 14, 15 are bottom and top views of the mechanism of FIG. 12. In FIGS. 14 and 15 the pack 1 was removed for a better understanding. The mechanism is in the position where the water inlet and the beverage outlet of the single insert 5 are being opened. The mechanism comprises:

a hollow water needle 81 supported by a support 810 (FIG. 15), an alignment and centring device 82 which presents a point configured for entering inside the centring hole of the single insert and supported by a support 820 (FIGS. 13 and 14), a device 84 for removing the plug of the beverage outlet of the pack. This device is a fork with two teeth. It is supported by a support member 840, a device 85 for pulling the plastic bond of the plug away from the beverage outlet of the pack once the plug is removed from the beverage outlet. This device is a plate able to slide between the plug 44 and the point 43a where the bond of the plug is attached to the single insert and comprises a slanted surface 85a configured for sliding along the surface of the bond of the plug when said device moves to the single insert. These both devices 84, 85 are supported by the same support member 840.

The rollers 11 of the mechanism are both attached to the same shaft 12. The shaft 12 supports two geared wheels 13a, 13b. Each of them cooperates with a rack rail 14a, 14b, respectively. The rotation of the rollers 11 induces the translation of the rack rails 14a, 14b along the horizontal axis XX' comprised in the plane shape P. Rack rails 14a, 14b are designed respectively at the bottom face of first and second longitudinal pieces 140a, 140b extending from the shaft 12 upfront to the receiving area. For each longitudinal piece 140a, 140b, its lateral face facing the single insert 5 positioned in the machine presents a shape designed to indirectly cooperate with the support members 810, 820, 840 as described hereunder.

The support members 810, 820 of the hollow water needle and of the alignment and centring device are attached together and consequently the movement of the support member 810 moves the other support member 820 accordingly. The support member 810 of the water injection needle is actuated by a first interfacing piece 811 able to rotate at a point A around the vertical axis. Said first interfacing piece 811 presents lateral sides designed to contact on one side with the lateral face of the support member 810 of the water injection needle and on another side with the lateral face of the first longitudinal piece 140a. The design of the faces in contact is such that the rotation of the rollers induces the movement of the needle 81 and the alignment and centring device 82 to the single insert 5.

The support member 840 of the fork 84 and the bond pulling device 85 is able to rotate at a point B around the vertical axis. The support member 840 presents a lateral side 841 designed to contact the lateral face of the second longitudinal piece 140b. The design of the faces in contact is such that the rotation of the rollers induces the rotation of the support member 840 and accordingly of movement of the fork 84 and the bond pulling device 85 so that they engage the plug and the bond in one sense and then rotate back due to a pulling spring.

The invention claimed is:

1. A pack with an inner volume in which a food or beverage ingredient is stored and in which a beverage is produced when water is introduced inside, the inner volume being defined by sheets of material joined at edges thereof, and the inner volume having a generally plane shape defining a plane vertically oriented during beverage production, the pack comprising at least one water inlet configured for introducing the water in the inner volume and at least one beverage outlet configured for delivering the beverage from the inner volume, the at least one water inlet and the at least one beverage outlet being included in a single insert, the single insert being positioned at a bottom of the pack and being partially positioned between joined bottom edges of the sheets of material, and an external end of the at least one water inlet is oriented essentially perpendicularly to the plane defined by the inner volume, and the single insert comprises a centring hole extending essentially perpendicularly to the generally plane shape of the inner volume.

2. The pack according to claim 1, wherein the external end of the at least one water inlet is covered by one of the sheets of material defining the inner volume.

3. The pack according to claim 1, wherein the external end of the at least one water inlet is not covered by one of the sheets of material defining the inner volume.

4. The pack according to claim 1, wherein the centring hole is at least partially covered by the joined bottom edges of the sheets of material.

5. The pack according to claim 1, wherein the centring hole is positioned under the joined bottom edges of the sheets of material.

6. The pack according to claim 1, wherein the at least one beverage outlet is closed by a plug configured for removal from the at least one beverage outlet to open the at least one beverage outlet at the beverage production, the plug comprising a plastic bond attached to the pack for maintaining the plug attached to the pack after opening of the at least one beverage outlet, the plug being positioned under the joined bottom edges of the sheets of material.

7. The pack according to claim 6, wherein the at least one beverage outlet is a pipe, and the pack comprises a connection between the pipe and the plug that is a smaller section than the upper surface of the plug.

8. The pack according to claim 6, wherein the plastic bond is attached to the single insert for maintaining the plug attached to the pack after the opening of the at least one beverage outlet, and the plastic bond is configured for being bent.

9. The pack according to claim 1, wherein the plastic bond comprises a notch.

10. The pack according to claim 1, wherein the sheets of material comprise a single flexible water impermeable sheet folded in half.

11. The pack according to claim 1, wherein the at least one beverage outlet comprises a tube with an internal diameter between 1.5 and 3 mm.

12. A System comprising:

a pack with an inner volume in which a food or beverage ingredient is stored and in which a beverage is produced when water is introduced inside, the inner volume being defined by sheets of material joined to one another at edges thereof, and the inner volume having a generally plane shape defining a plane vertically oriented during beverage production, the pack comprising at least one water inlet for introducing the water in the inner volume and at least one beverage outlet for delivering the beverage from the inner volume, the at least one water inlet and the at least one beverage outlet being included in one single insert, the single insert being positioned at a bottom of the pack and being partially positioned between two joined bottom edges of the sheets of material, and an external end of the at least one water inlet being oriented essentially perpendicularly to the plane defined by the inner volume, and the single insert comprises a centring hole extending essentially perpendicularly to the generally plane shape of the inner volume; and a machine for preparing beverages, the machine comprising:

a receiving area for positioning the pack in the machine so that the generally plane shape of the inner volume is vertically oriented and so that the single insert is positioned at the bottom of the pack, a water needle configured for injecting water in the at least one water inlet of the pack, and an immobilization and centring device configured for cooperating with the centring hole of the single insert.

13. The system according to claim 12, wherein the single insert of the pack comprises a shape for cooperating with a pack receiving area of the machine.

14. The system according to claim 12, wherein the pack comprises recognition means readable by the machine.

15. A method for the preparation of a food or beverage with a system comprising a pack with an inner volume in which a food or beverage ingredient is stored and in which the food or beverage is produced when water is introduced inside, the inner volume being defined by sheets of material joined to one another at edges thereof, and the inner volume having a generally plane shape defining a plane vertically oriented during food or beverage production, the pack comprising at least one water inlet for introducing the water in the inner volume and at least one beverage outlet for delivering the food or beverage from the inner volume, the at least one water inlet and the at least one beverage outlet being included in a single insert, the single insert being positioned at a bottom of the pack and being partially positioned between the bottom joined edges of the sheets of material, and an external end of the at least one water inlet being oriented essentially perpendicularly to the plane defined by the inner volume, and the single insert comprises a centring hole extending essentially perpendicularly to the generally plane shape of the inner volume; and the system further comprising a machine for preparing beverages, the machine comprising a receiving area for positioning the pack in the machine so that the generally plane shape of the inner volume is vertically oriented and so that the single insert is positioned at the bottom of the pack, the machine further comprising a water needle for injecting water in the at least one water inlet of the pack, and the machine further comprising an immobilization and centring device configured for cooperating with the centring hole of the single insert, comprising the steps of:

positioning the pack in the machine;

centering the pack and opening the at least one water inlet;

injecting water into the pack to mix with the food or beverage ingredient; and allowing the prepared food or beverage to escape through the at least one beverage outlet into a receptacle.

* * * * *